US010734845B2

(12) United States Patent
Suga et al.

(10) Patent No.: US 10,734,845 B2
(45) Date of Patent: Aug. 4, 2020

(54) WIRELESS POWER TRANSMISSION SYSTEM AND INDUCTION HEATING COOKER

(71) Applicants: Mitsubishi Electric Corporation, Tokyo (JP); Mitsubishi Electric Home Appliance Co., Ltd., Fukaya-shi, Saitama (JP)

(72) Inventors: Ikuro Suga, Tokyo (JP); Jun Bunya, Tokyo (JP); Miyuki Takeshita, Tokyo (JP)

(73) Assignees: Mitsubishi Electric Corporation, Tokyo (JP); Mitsubishi Electric Home Appliance Co., Ltd., Fukaya-shi, Saitama (JP)

(*) Notice: Subject to any disclaimer, the term of this patent is extended or adjusted under 35 U.S.C. 154(b) by 0 days.

(21) Appl. No.: 16/095,631

(22) PCT Filed: Jun. 30, 2016

(86) PCT No.: PCT/JP2016/069532
§ 371 (c)(1),
(2) Date: Oct. 22, 2018

(87) PCT Pub. No.: WO2018/003092
PCT Pub. Date: Jan. 4, 2018

(65) Prior Publication Data
US 2019/0131824 A1 May 2, 2019

(51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02J 5/005* (2013.01); *H02J 7/025* (2013.01);
(Continued)

(58) Field of Classification Search
CPC . H02J 50/00; H02J 50/12; H02J 50/80; F24C 7/00; H05B 6/00; H05B 2213/05
(Continued)

(56) References Cited

U.S. PATENT DOCUMENTS 3,989,916 A * 11/1976 Amagami ............. H02M 7/523
219/622
4,151,387 A * 4/1979 Peters, Jr. ................ F24C 7/02
219/623
(Continued)

FOREIGN PATENT DOCUMENTS

JP   H04-095383 A   3/1992
JP   2010-108796 A   5/2010
(Continued)

OTHER PUBLICATIONS

International Search Report of the International Searching Authority dated Sep. 13, 2016 for the corresponding International application No. PCT/JP2016/069532 (and English translation).

*Primary Examiner* — Rexford N Barnie
*Assistant Examiner* — Joseph N Inge
(74) *Attorney, Agent, or Firm* — Posz Law Group, PLC

(57) ABSTRACT

A wireless power transmission apparatus according to the present invention includes a coil which generates a high-frequency magnetic field upon reception of a high-frequency current, a support which supports the power receiving device within the high-frequency magnetic field, an inverter circuit which supplies the high-frequency current to the coil, and a controller which controls the driving of the inverter
(Continued)

circuit. The controller performs a power transmission operation to transmit power to the power receiving device, if the impedance on the output side of the inverter circuit exhibits a resonant characteristic as the driving frequency of the inverter circuit is changed.

14 Claims, 8 Drawing Sheets

(51) Int. Cl.
*H02J 50/80* (2016.01)
*H02J 5/00* (2016.01)
*H02J 7/02* (2016.01)
*H05B 6/06* (2006.01)
*H05B 6/12* (2006.01)

(52) U.S. Cl.
CPC .............. *H02J 50/80* (2016.02); *H05B 6/062* (2013.01); *H05B 6/1236* (2013.01); *H05B 2213/05* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 7,989,986 B2* | 8/2011 | Baarman | ................. | H02J 5/005 |
| | | | | 307/104 |
| 2006/0290295 A1* | 12/2006 | Yang | ........................ | H05B 6/04 |
| | | | | 315/274 |
| 2007/0221668 A1* | 9/2007 | Baarman | ................ | A47J 36/321 |
| | | | | 219/746 |
| 2008/0017633 A1* | 1/2008 | Hosoi | ................... | H05B 6/1245 |
| | | | | 219/624 |
| 2012/0049640 A1* | 3/2012 | Ichikawa | ................ | H02J 5/005 |
| | | | | 307/99 |
| 2014/0014647 A1* | 1/2014 | Brosnan | ................. | H05B 6/062 |
| | | | | 219/600 |
| 2014/0027443 A1* | 1/2014 | Lee | ........................ | H05B 6/062 |
| | | | | 219/620 |
| 2014/0158680 A1* | 6/2014 | Kitaizumi | .............. | H05B 6/062 |
| | | | | 219/665 |
| 2014/0292101 A1* | 10/2014 | Baarman | ................. | H02J 50/12 |
| | | | | 307/104 |
| 2015/0245416 A1* | 8/2015 | Yoshino | ................. | H05B 6/062 |
| | | | | 99/358 |
| 2016/0079812 A1* | 3/2016 | Sakai | ....................... | H02J 50/10 |
| | | | | 307/104 |
| 2018/0063891 A1* | 3/2018 | Imai | ....................... | H05B 6/062 |

FOREIGN PATENT DOCUMENTS

| | | |
|---|---|---|
| JP | 2012-070614 A | 4/2012 |
| JP | 2013-187963 A | 9/2013 |
| WO | 2013/094174 A1 | 6/2013 |
| WO | 2015/125263 A1 | 8/2015 |

* cited by examiner

WIRELESS POWER TRANSMISSION SYSTEM AND INDUCTION HEATING COOKER

CROSS REFERENCE TO RELATED APPLICATION

This application is a U.S. national stage application of International Application No. PCT/JP2016/069532, filed on Jun. 30, 2016, the contents of which are incorporated herein by reference.

TECHNICAL FIELD

The present invention relates to a wireless power transmission system and an induction heating cooker, which transmit power to a power receiving device.

BACKGROUND

In conventional wireless power transmission apparatuses, a load determining unit is provided to determine whether a load placed on a top plate is an electrical device or not and when the load determining unit determines that the load is an electrical device, an inverter is controlled in association with the electrical device (e.g., see Patent Literature 1).

PATENT LITERATURE

Patent Literature 1: International Publication No. 2013/094174

A wireless power transmission apparatus disclosed in Patent Literature 1 determines whether a load is an object to be inductively heated or an electrical device (power receiving device) to be powered wirelessly, based on based on how the value of input current varies as the time for which a semiconductor switch is in on state is varied.

However, objects to be inductively heated vary in material, shape, size, etc. With respect to a relationship between the variation of the value of the input current and the variation of the time for which a semiconductor switch is in on state, some objects to be heated have a characteristic which is close to characteristics of electrical devices. Therefore, there is a case where an error is made in the result of determination made by the load determination unit. If an error is made in the result of the determination by the load determination unit, it is impossible to supply appropriate power to an electrical device.

SUMMARY

The present invention has been made to solve the above problem, and an object of the invention is to provide a wireless power transmission system and an induction heating cooker, which can supply appropriate power to a power receiving device.

A wireless power transmission apparatus according to an embodiment of the present invention transmits power to a power receiving device including a resonant circuit. The wireless power transmission apparatus includes a coil which generates a high-frequency magnetic field upon reception of a high-frequency current, a support which supports the power receiving device within the high-frequency magnetic field, an inverter circuit which supplies the high-frequency current to the coil, and a controller which controls driving of the inverter circuit. The controller performs a power transmission operation to transmit power to the power receiving device, if the impedance on the output side of the inverter circuit exhibits a resonant characteristic as the driving frequency of the inverter circuit is changed.

In a wireless power transmission apparatus according to an embodiment of the present invention, if the impedance on an output side of an inverter circuit exhibits a resonant characteristic, a power transmission operation to transmit power to a power receiving device is performed, whereby appropriate power can be supplied to the power receiving device.

DETAILED DESCRIPTION

Embodiment 1
(Configuration)

Figure 1:
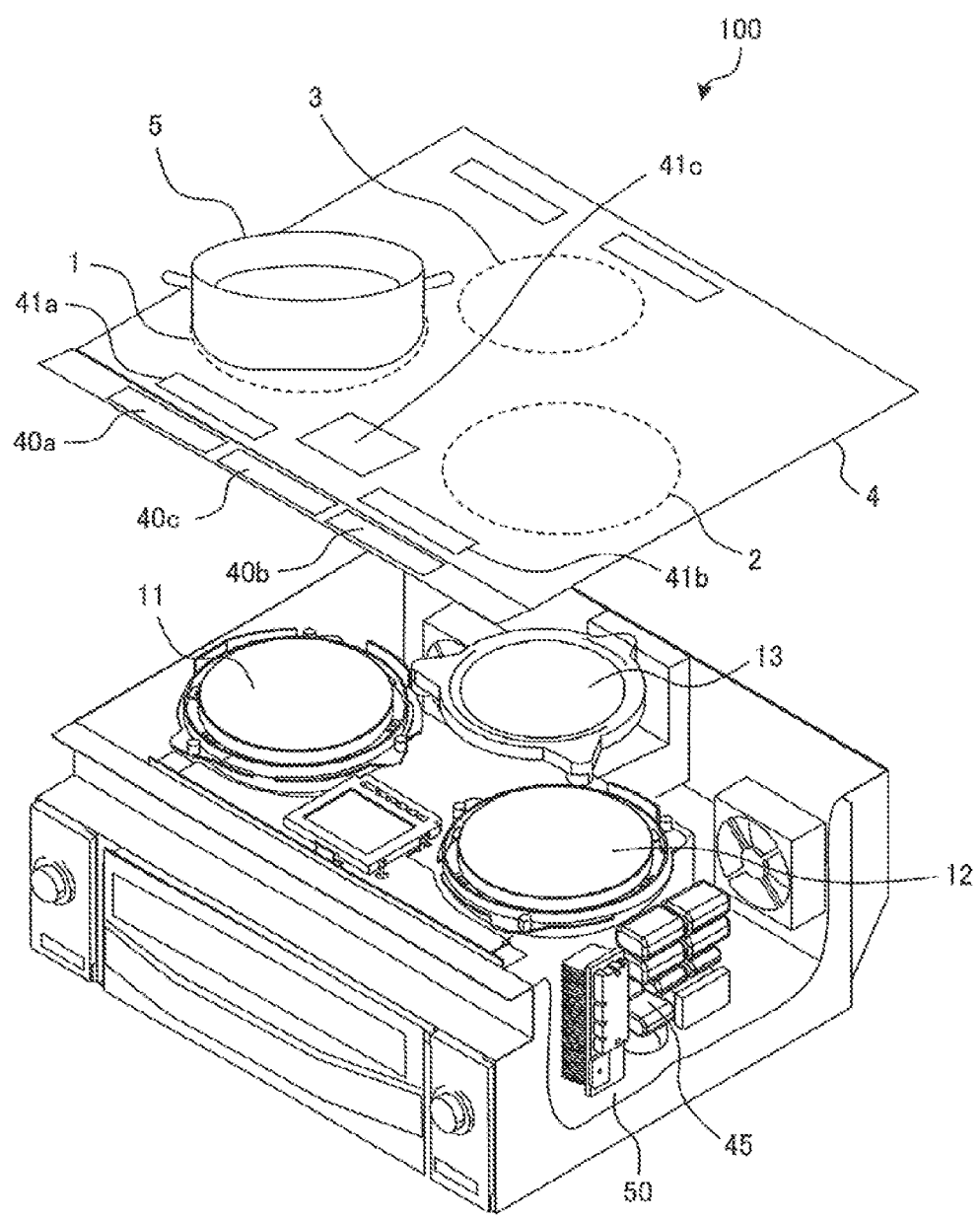
FIG. 1 is an exploded perspective view of an induction heating cooker according to embodiment 1 of the present invention.

FIG. 1 is an exploded perspective view of an induction heating cooker according to embodiment 1 of the present invention.

As illustrated in FIG. 1, an induction heating cooker 100 includes, at its top, a top plate 4 on which an object 5 to be heated, such as a pot, is to be placed. In the induction heating cooker 100 according to embodiment 1, as will be described later with reference to, for example, FIG. 3, a power receiving device 200 is also placed on the top plate 4. The induction heating cooker 100 according to embodiment 1 functions as a wireless power device which transmits power to the power receiving device 200.

The top plate 4 includes a first induction heating zone 1 and a second induction heating zone 2 as heating zones for inductively heating the object 5. The first induction heating zone 1 and the second induction heating zone 2 are laterally arranged side by side in an area close to a front edge of the top plate 4. The induction heating cooker 100 according to embodiment 1 also includes a third induction heating zone 3 as a third heating zone. The third induction heating zone 3 is located behind the first induction heating zone 1 and the second induction heating zone 2 and in a central area of the top plate 4 which is located at substantially the center of the top plate 4 in a lateral direction thereof.

Under the first induction heating zone 1, the second induction heating zone 2, and the third induction heating zone 3, respective induction heating coils, i.e., a first induction heating coil 11, a second induction heating coil 12 and a third induction heating coil 13, are provided. Each of the first to third induction heating coils 11 to 13 heats an object to be heated, which is placed on a respective one of the heating zones.

The entire top plate 4 is made of a material which transmits infrared radiation, such as heat-resistant tampered glass or crystallized glass. Also, at the top plate 4, circular pot-position indicators are formed by paint coating, printing or other methods, at positions corresponding to respective heating areas (heating zones) of the first induction heating coil 11, the second induction heating coil 12, and the third induction heating coil 13, the pot-position indicators being provided to roughly indicate where to place a pot.

An operation unit 40 is provided close to the front edge of the top plate 4. The operation unit 40 functions as an input device which make settings regarding heating power (electric power), cooking menu (for example, water boiling mode or fryer mode), etc., the heating power being to be applied to heating of the object 5 or the like using the first induction heating coil 11, the second induction heating coil 12. In embodiment 1, the operation unit 40 is divided into an operation unit 40a, an operation unit 40b, and an operation unit 40c, which are provided for the respective induction heating coils.

A display unit 41 is provided as a notification unit, close to the operation unit 40. The display unit 41 displays information such as an operating state of each of the induction heating coils, and details of an operation and an input from the operation unit 40. In embodiment 1, the display unit 41 is divided into a display unit 41a, a display unit 41b and a display unit 41c which are provided for the respective induction heating coils.

It should be noted that each of the operation unit 40 and the display unit 41 are not limited to the case where it is divided into operation or display units which are provided for the respective induction heating coils or the case where it is shared among the induction heating coils. For example, the operation unit 40 is constituted by, for example, a mechanical switch such as a push switch or a tactile switch, or a touch switch which detects an input operation based on a change in electrode capacitance. Also, the display unit 41 is constituted by, for example, a liquid crystal device (LCD) or an LED.

The operation unit 40 and the display unit 41 may be combined into a display and operation unit 43. The display and operation unit 43 is constituted by, for example, a touch panel provided with a touch switch located on an upper surface of an LCD.

The first induction heating coil 11, the second induction heating coil 12, and the third induction heating coil 13 are configured as described below, for example. It should be noted that the first induction heating coil 11, the second induction heating coil 12 and the third induction heating coil 13 have the same configuration. Therefore, the configuration will be described by referring to the configuration of the first induction heating coil 11.

Figure 2:
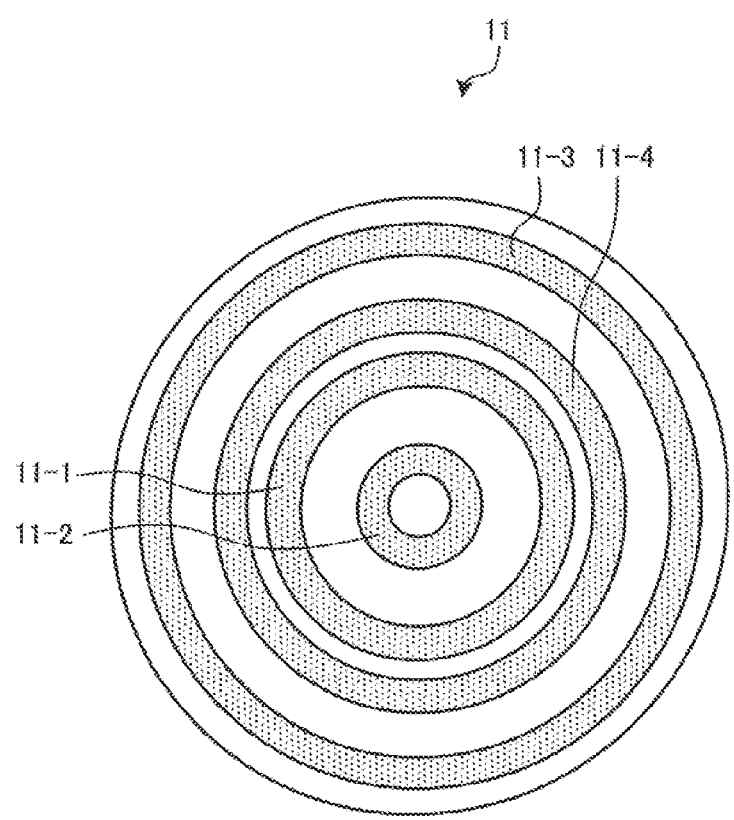
FIG. 2 is a plan view of an induction heating coil of the induction heating cooker according to embodiment 1 of the present invention.

FIG. 2 is a plan view of an induction heating coil of the induction heating cooker according to embodiment 1 of the present invention.

The first induction heating coil 11 is made up of a plurality of coils which are substantially concentrically arranged. For example, the first induction heating coil 11 is made up of four coils 11-1 to 11-4 substantially concentrically arranged. The coils 11-1 to 11-4 are connected and provided as a single continuous coil. The coils 11-1 to 11-4 are each formed as a winding of a conductive wire made of arbitrary insulated metal (for example, copper or aluminum).

When high-frequency power is supplied from a driving circuit 50 to the first induction heating coil 11, the second induction heating coil 12 and the third induction heating coil 13, a high-frequency magnetic field is generated from each of these induction heating coils. The configuration of the driving circuit 50 will be described later in detail.

As illustrated in FIG. 1, a control unit 45 is accommodated in the induction heating cooker 100 to control the overall operation of the induction heating cooker 100 including the driving circuit 50.

Figure 3:
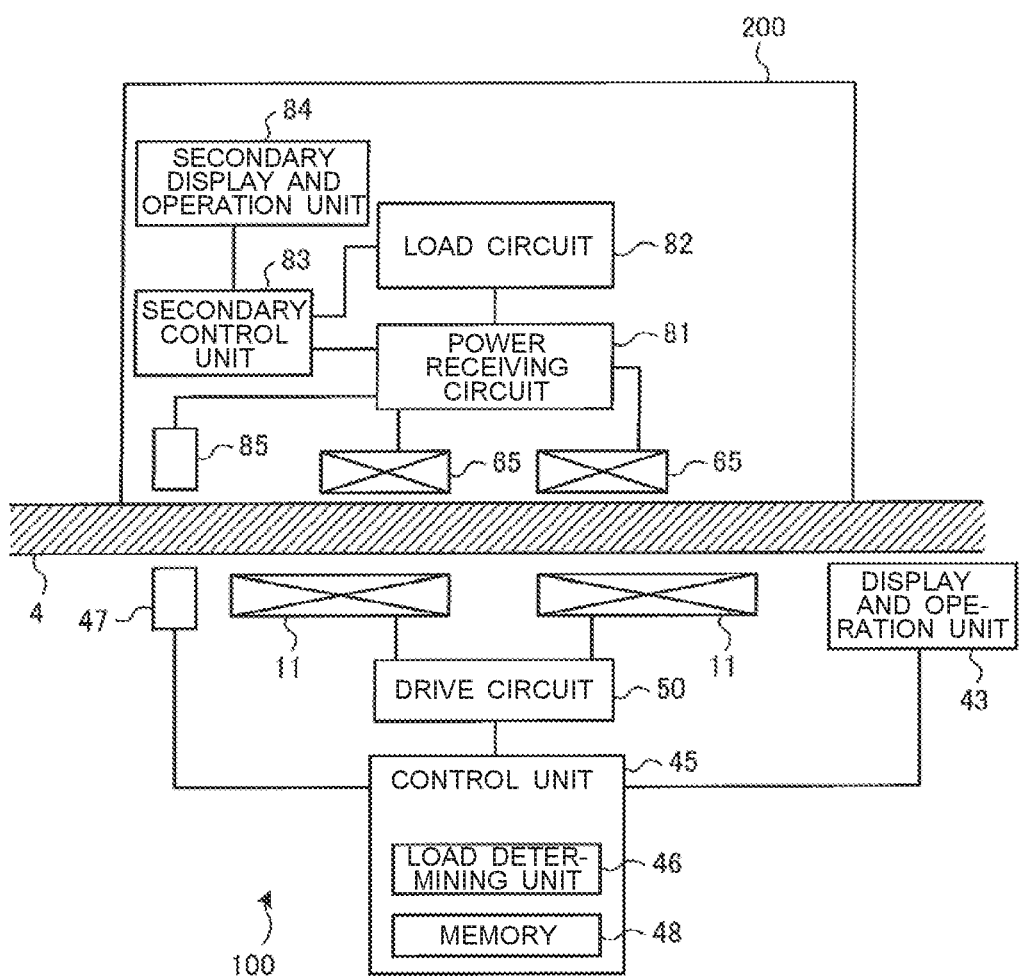
FIG. 3 is a block diagram illustrating a configuration of the induction heating cooker according to embodiment 1 of the present invention and a configuration of a power receiving device placed on a top plate of the induction heating cooker.

The control unit 45 is constituted by specific hardware or a central processing unit (CPU, and also referred to as a processing unit, arithmetic unit, microprocessor, microcomputer, or processor) which executes a program stored in a memory 48 (see FIG. 3).

In the case where the control unit 45 is specific hardware, the control unit 45 corresponds to, for example, a single circuit, a composite circuit, an application specific integrated circuit (ASIC), a field-programmable gate array (FPGA), or a combination of these circuits. As functional units each of which can be implemented by the control unit 45, respective hardware may be applied, or single hardware may be applied.

In the case where the control unit 45 is a CPU, each of functions to be performed by the control unit 45 is implemented by software, firmware or a combination of software and firmware. The software or firmware is described as a program, and stored in the memory 48. The CPU reads and executes the program stored in the memory 48, thereby performing each function of the control unit 45. The memory 48 is, for example, a non-volatile or volatile semiconductor memory such as a RAM, a ROM, a flash memory, an EPROM or an EEPROM.

The functions of the control unit 45 may be partially implemented by specific hardware, and may be partially implemented by software or firmware.

FIG. 3 is a block diagram illustrating the configuration of the induction heating cooker according to embodiment 1 of the present invention, and the configuration of a power receiving device placed on the top plate of the induction heating cooker. To be more specific, in the state illustrated in FIG. 3, the power receiving device 200 is placed on the first induction heating zone 1 located at the top surface of the top plate 4 of the induction heating cooker 100. The induction heating cooker 100 which functions as a wireless power transmission apparatus and the power receiving device 200 form a wireless power transmission system.

As illustrated in FIG. 3, the power receiving device 200 is, for example, a cooking appliance (for example, a fryer, a steamer, a roster or a toaster) provided to do cooking other than induction-heating cooking. Alternatively, the power receiving device 200 is a cooking appliance (e.g., a blender, a mixer, a mill, a whisk, or a food processor) for use in, for example, making preparations for cooking or performing pre-cooking processing.

The power receiving device 200 includes a power receiving coil 65 which receives power through electromagnetic induction, a power receiving circuit 81 which rectifies and smooths power received by the power receiving coil 65, a load circuit 82 connected to an output side of the power receiving circuit 81, and a secondary control unit 83 which controls the power receiving circuit 81 and the load circuit 82.

The power receiving device 200 is placed on the top plate 4 of the induction heating cooker 100 to wirelessly receive power from the induction heating cooker 100. To be more specific, when high-frequency power is supplied by the driving circuit 50 to the first induction heating coil 11 located under the top plate 4 of the induction heating cooker 100, a high-frequency magnetic field is generated from the first induction heating coil 11. The high-frequency magnetic field is received by the power receiving coil 65 provided in the power receiving device 200, and thus power is wirelessly supplied to the power receiving device 200.

At this time, in the case where the load circuit 82 is a heater load, the secondary control unit 83 of the power receiving device 200 controls the power receiving circuit 81 to supply power received by the power receiving coil 65 to the load circuit 82 as alternating-current power without any processing.

Furthermore, in the case where, for example, the load circuit 82 is a motor load, the secondary control unit 83 controls the power receiving circuit 81 such that power received by the power receiving coil 65 is rectified and smoothed, and converted into arbitrary alternating-current power by an inverter circuit or the like, and the alternating-current power is supplied to the load circuit 82. That is, in the case where the load circuit 82 is a motor load, the load circuit 82 is driven at a variable speed. It should be noted that direct current obtained by rectifying and smoothing received power may be applied to a heater load. Needless to say, the motor load may be driven at a constant speed.

It is preferable that the power receiving device 200 be provided with an operation unit and a display unit. The operation unit may be used to perform, for example, operations such as starting and stopping the supply of power to the power receiving device 200. The display unit displays, for example, information such as the state of reception of power by the power receiving device 200. In embodiment 1, the operation unit and the display unit are formed as a single body, that is, a display and operation unit 84.

The induction heating cooker 100 may be provided with a primary-side transmission and reception unit 47, and the power receiving device 200 may be provided with a secondary-side transmission and reception unit 85. The secondary-side transmission and reception unit 85 outputs a device identification signal for identifying the power receiving device 200 to the primary-side transmission and reception unit 47. The primary-side transmission and reception unit 47 receives a control signal output by the secondary-side transmission and reception unit 85, and sends the control signal to the control unit 45.

Although it is not illustrated in FIG. 3, the power receiving coil 65 has the same configuration or a similar configuration to the configuration of, for example, the first induction heating coil 11.

Also, although it is not illustrated in FIG. 3, a ferrite is provided under the first induction heating coil 11 as a magnetic body. The shape of the ferrite is, for example, flat. At an upper top surface of the flat-shaped ferrite, protrusions may be formed to be inserted between coils forming the first induction heating coil 11, whereby a longitudinal section of the ferrite is shaped to be in, for example, a convex shape, an F-shape or an E-shape. Furthermore, although it is not illustrated in FIG. 3, a ferrite is provided on an upper portion of the power receiving coil 65 as a magnetic body. The shape of the ferrite is, for example, flat. At a lower surface of the flat-shaped ferrite, protrusions inserted between coils forming the power receiving coil 65 may be formed, whereby the longitudinal section of the ferrite is shaped to be in, for example, a convex shape, an F-shape or an E-shape.

Figure 4:
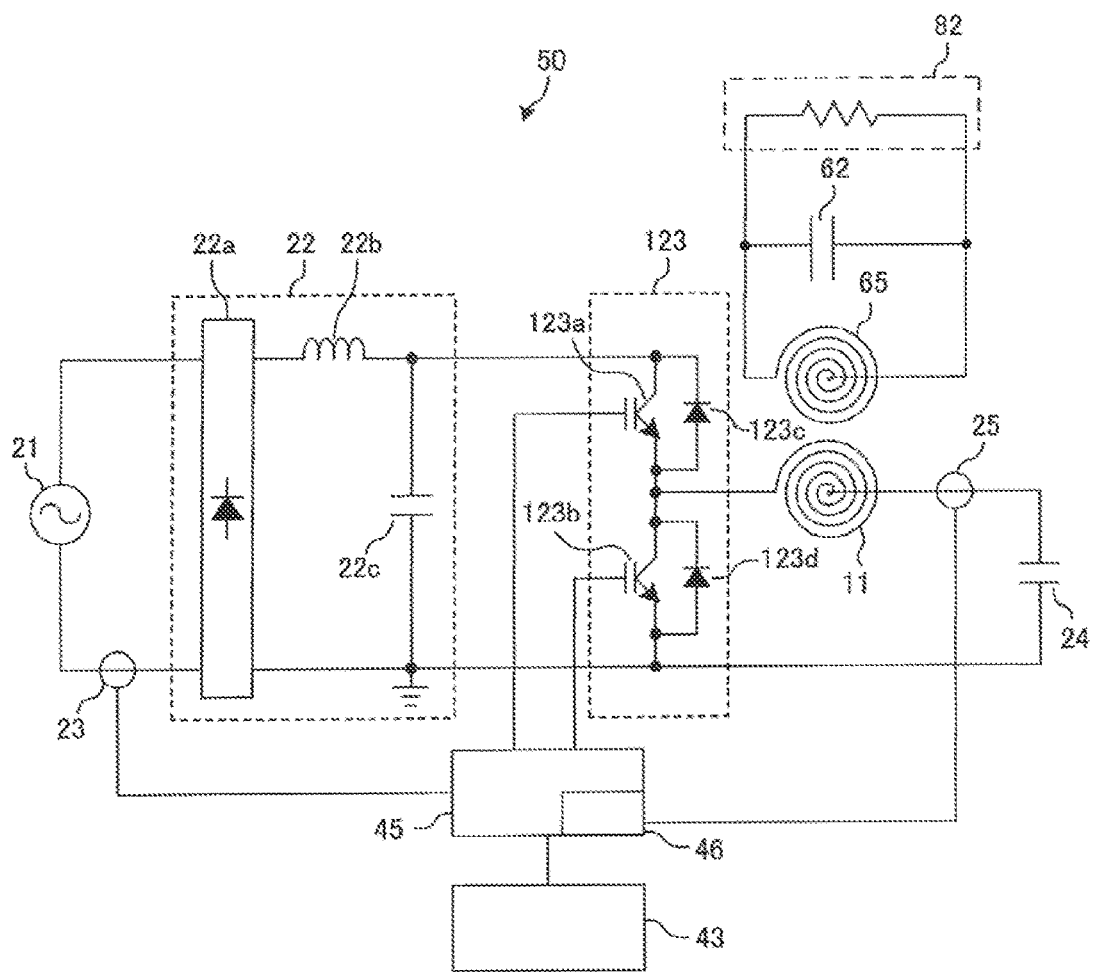
FIG. 4 is a circuit diagram illustrating a configuration of a power receiving device and a driving circuit of the induction heating cooker according to embodiment 1 of the present invention.

FIG. 4 is a circuit diagram illustrating a configuration of a power receiving device and a driving circuit of the induction heating cooker according to embodiment 1 of the present invention. FIG. 4 illustrates the circuit configuration of the driving circuit 50 for the first induction heating coil 11, the control unit 45, a load determination unit provided in the control unit 45, and the power receiving device 200. Control units, load determination units and driving circuits which are connected to the second induction heating coil 12 and the third induction heating coil 13 also have the same configuration as the driving circuit 50 and the control unit 45 as illustrated in FIG. 4.

The driving circuit 50 is a half-bridge driving circuit. The driving circuit 50 includes a direct-current power supply circuit 22, an inverter circuit 123, and a power-transmission-side resonant capacitor 24.

An input-current detecting unit 23 is constituted by, for example, a current sensor. The input-current detecting unit 23 detects current which is input from an alternating-current power supply (commercial power supply) 21 to the direct-current power supply circuit 22, and outputs a voltage signal corresponding to the value of the input current to the control unit 45.

The direct-current power supply circuit 22 includes a diode bridge 22a, a reactor 22b and a smoothing capacitor 22c. The direct-current power supply circuit 22 converts an alternating-current voltage input from the alternating-current power supply 21 into a direct-current voltage, and outputs the direct-current voltage to the inverter circuit 123.

The inverter circuit 123 is a half-bridge type inverter in which IGBTs 123a and 123b functioning as switching elements are connected in series to the output of the direct-current power supply circuit 22. In the inverter circuit 123, diodes 123c and 123d functioning as flywheel diodes are connected parallel to respective IGBTs, i.e., the IGBTs 123a and 123b. The IGBT 123a and the IGBT 123b are driven to be in on-state and in off-state by a drive signal output from the control unit 45. To be more specific, the control unit 45 outputs a drive signal for alternately turning on and off the IGBT 123a and the IGBT 123b, such that the IGBT 123b is in off-state while the IGBT 123a is in on-state, and the IGBT 123b is in on-state while the IGBT 123a is in off-state. As a result, the inverter circuit 123 converts direct-current power output from the direct-current power supply circuit 22 into alternating-current power at a specified frequency, and supplies the alternating-current power to a resonant circuit made up of the first induction heating coil 11 and the power-transmission-side resonant capacitor 24. The above alternating-current power at a specified frequency is, for example, AC power at a high frequency of approximately 20 to 100 kHz.

The power-transmission-side resonant capacitor 24 is connected in series to the first induction heating coil 11. The resonant circuit having this structure has a resonant frequency which depends on, for example, the inductance of the first induction heating coil 11 and the capacitance of the power-transmission-side resonant capacitor 24.

With the driving circuit 50 configured as described above, a high-frequency current flows through the first induction heating coil 11, and a high-frequency flux generated by the high-frequency current flowing through the first induction heating coil 11 enables power to be wirelessly transmitted to the power receiving coil 65 of the power receiving device 200 placed on the top plate 4 located directly above the first induction heating coil 11.

It should be noted that although each of the IGBTs 123a and 123b functions as switching elements is constituted by, for example, a silicon-based semiconductor, these switching elements may be each constituted by a wide-bandgap semiconductor formed of silundum or gallium nitride-based material. In the case where the switching elements are formed of wide-bandgap semiconductors, the following advantages are obtained: the loss of the switching elements can be reduced; in the case where the switching frequency (driving frequency) is set to be high (high speed), heat-transfer fins of the driving circuit 50 can be made smaller in size and cost, since the heat transmission characteristics of the driving circuit 50 are satisfactory; and even when the switching elements are driven at a high frequency, the switching loss is small, and power can be wirelessly suppled with a high efficiency.

A coil-current detecting unit 25 is connected to a resonator circuit made up of the first induction heating coil 11 and the power-transmission-side resonant capacitor 24. The coil-current detecting unit 25 is constituted by, for example, a current sensor. The coil-current detecting unit 25 detects current flowing through the first induction heating coil 11, and outputs a voltage signal corresponding to the value of the current to the control unit 45.

Although FIG. 4 illustrates a half-bridge driving circuit, needless to say, a full-bridge driving circuit made up of four IGBTs and four diodes may be applied.

The power receiving device 200 is provided with a power-reception-side resonant capacitor 62 which forms together with the power receiving coil 65 a resonant circuit.

The power-reception-side resonant capacitor 62 is connected parallel to the power receiving coil 65. The resonant circuit having this structure has a resonant frequency which depends on, for example, the inductance of the power receiving coil 65 and the capacitance of the power-reception-side resonant capacitor 62. The inductance of the power receiving coil 65 has a resonant frequency which depends on a resonant circuit produced when the first induction heating coil 11 is magnetically coupled to the power receiving coil 65.

Although FIG. 4 illustrates a resonant circuit in which the power receiving coil 65 is connected parallel to the power-reception-side resonant capacitor 62, the power-reception-side resonant capacitor 62 may be connected in series to the power receiving coil 65 to from a resonant circuit.

The control unit 45 includes a load determining unit 46. The load determining unit 46 determines whether a load placed on the top plate 4 is the power receiving device 200 or not, in accordance with whether the impedance characteristics of an output side of the inverter circuit 123 exhibit a resonant characteristic as the driving frequency of the inverter circuit 123 is changed.

The first induction heating coil 11, the second induction heating coil 12 and the third induction heating coil 13 each correspond to "coil" according to the present invention.

The top plate 4 corresponds to "support" according to the present invention.

The control unit 45 corresponds to "controller" according to the present invention.

The load determining unit 46 is included in "controller" according to the present invention.

The display unit 41 corresponds to "notification unit" according to the present invention.

The memory 48 corresponds to "storage unit" according to the present invention.

(Impedance Characteristics)

The impedance characteristics of the power receiving device 200 including a resonant circuit and those of the object 5 such as a pot will be described.

Figure 5:
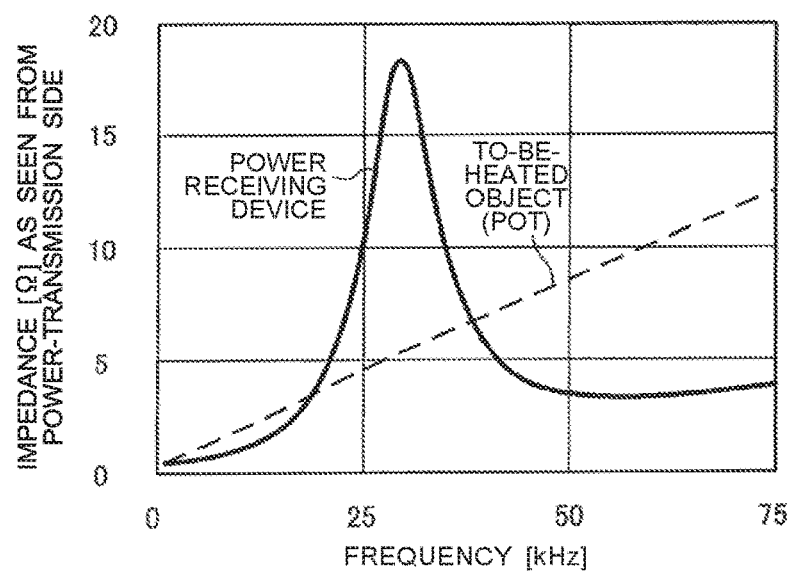
FIG. 5 illustrates an example of impedance characteristics of the power receiving device and an object to be heated.

FIG. 5 is a view indicating an example of impedance characteristics of a power receiving device and an object to be heated.

In FIG. 5, the horizontal axis represents the driving frequency of the inverter circuit 123, and the vertical axis represents an impedance on the output side of the inverter circuit 123 (an impedance as seen from the power-transmission side).

As illustrated in FIG. 5, in the case where the load is the power receiving device 200 including a resonant circuit, the impedance is the maximum at the resonant frequency of the resonant circuit, and the impedance decreases at frequencies lower than the resonant frequency and at frequencies higher than the resonant frequency.

That is, at the frequencies higher than the resonant frequency, the impedance in the case where the load is the power receiving device 200 exhibits a resonant characteristic that the impedance increases as the driving frequency decreases.

At the frequencies lower than the resonant frequency, the impedance in the case where the load is the power receiving device 200 exhibits a resonant characteristic that the impedance increases as the driving frequency increases.

Furthermore, at frequencies including the resonant frequency, the impedance in the case where the load is the power receiving device 200 exhibits a resonant characteristic that the impedance increases or decreases as the driving frequency varies.

By contrast, in the case where the load is the object 5 including no resonant circuit, such as a pot, the impedance decreases monotonously as the driving frequency decreases. That is, the impedance in the case where the load is the object 5 exhibits a characteristic that the impedance decreases monotonously as the driving frequency decreases. Also, the impedance in the case where the load is the object 5 exhibits a characteristic that the impedance increases monotonously as the driving frequency increases.

(Load Determination Operation)

Next, a load determination operation to determine a load based on the above impedance characteristics will be described.

The load determining unit 46 provided in the control unit 45 starts a load determination operation based on an operation start signal supplied from the operation unit 40.

In the load determination operation, the control unit 45 drives the inverter circuit 123 with a specific drive signal for use in load determination. The load determining unit 46 detects coil current from a current detection signal supplied from the coil-current detecting unit 25.

Next, the control unit 45 decreases the driving frequency of the inverter circuit 123 from a high frequency to a low frequency. The load determining unit 46 successively detects coil current from current detection signals supplied from the coil-current detecting unit 25.

At this time, due to a switching operation of the inverter circuit 123, the direct-current output voltage of the direct-current power supply circuit 22 is output in the form of a square wave as the output voltage of the inverter circuit 123. In the case where a change in the output voltage of the inverter circuit 123 is assumed to be small, a change in coil current flowing through the first induction heating coil 11 is substantially equivalent to a change in the impedance of the load. That is, the coil current decreases as the impedance increases, and the coil current increases as the impedance decreases.

Therefore, the load determining unit 46 according to embodiment 1 makes a load determination in accordance with whether or not the coil current exhibits a resonant characteristic when the driving frequency of the inverter circuit 123 is changed.

To be more specific, in the case where a current detection signal supplied form the coil-current detecting unit 25 decreases (the impedance increases) as the driving frequency of the inverter circuit 123 is decreased, the load determining unit 46 determines that the load placed on the top plate 4 is the power receiving device 200

By contrast, in the case where the current detection signal from the coil-current detecting unit 25 increases (the impedance decreases) as the driving frequency of the inverter circuit 123 is decreased, the load determining unit 46 determines that the load placed on the top plate 4 is the object 5.

The driving frequency to be changed in the load determination operation is set to a frequency higher than the resonant frequency of the first induction heating coil 11 and the power-transmission-side resonant capacitor 24.

For example, in the case where the resonant frequency of the first induction heating coil 11 and the power-transmission-side resonant capacitor 24 is 18 kHz, the driving frequency to be changed in the load determination operation is set to a frequency higher than or equal to 20 kHz.

Thereby, it is possible to prevent a phase-advanced signal from flowing through the inverter circuit 123 and breaking the inverter circuit 123.

It should be noted that the range within which the driving frequency of the inverter circuit 123 in the load determination operation is changed may be set to an arbitrary frequency range which falls within the range of 20 kHz or more to less than 100 kHz.

For example, in the case where the resonant frequency of the resonant circuit of the power receiving device 200 is assumed to be approximately 28 kHz by performing a repetitive learning function (to be described later), the driving frequency of the inverter circuit 123 may be decreased from 50 kHz to 20 kHz in the load determination operation. Thereby, it is possible to shorten the time required for the load determination operation.

After performing the above load determination operation, the control unit 45 performs a control operation based on the result of the load determination.

(Power Transmission Operation)

In the case where the load determining unit 46 determines that the load is the power receiving device 200, the control unit 45 performs a power transmission operation to transmit power to the power receiving device 200.

To be more specific, the control unit 45 controls the driving circuit 50 in accordance with power to be transmitted to the power receiving coil 65, to supply high-frequency power to the first induction heating coil 11. Thereby, the high-frequency power supplied from the first induction heating coil 11 is received by the power receiving coil 65 provided in the power receiving device 200. The received power is supplied from the power receiving circuit 81 to the load circuit 82 to drive the load circuit 82.

(Heating Operation)

When the load determining unit 46 determines that the load is the object 5, the control unit 45 performs a heating operation to inductively heat the object 5.

That is, the control unit 45 performs a heating operation in which high-frequency power is supplied to the first induction heating coil 11 by controlling the driving circuit 50 in accordance with heating power to be applied to induction heating. Thereby, the object 5 placed on the top plate 4 is inductively heated.

As described above, according to embodiment 1, the control unit 45 performs a power transmission operation to transmit power to the power receiving device 200, in the case where the impedance on the output side of the inverter circuit 123 exhibits a resonant characteristic as the driving frequency of the inverter circuit 123 is changed.

Thus, appropriate power can be supplied to the power receiving device 200. Furthermore, based on a resonant characteristic of the impedance, it is possible to easily and reliably determine whether the load is the object 5 to be inductively heated or the power receiving device 200 to be powered wirelessly.

In embodiment 1, in the case where the impedance exhibits a resonant characteristic that the impedance increases as the driving frequency of the inverter circuit 123 decreases, the load determining unit 46 determines that the load is the power receiving device 200. In other words, the load determination is made in accordance with the presence or absence of a resonant characteristic which the object 5 such as a pot does not have, thereby improving the accuracy of the load determination.

Also, in embodiment 1, in the case where the coil current exhibits a resonant characteristic as the driving frequency of the inverter circuit 123 is changed, the load determining unit 46 determines that the load is the power receiving device 200. Thus, a configuration necessary for the load determination can be achieved with a simple configuration.

Embodiment 2

With respect to embodiment 2, the following description is made by referring to a load determination operation in which the driving frequency of the inverter circuit 123 is increased from a low frequency to a high frequency.

Also, the load determination operation according to embodiment 2 will be described mainly by referring to on what point it is different from the load determination operation according to embodiment 1.

(Load Determination Operation)

The load determining unit 46 provided in the control unit 45 starts a load determination operation based on an operation start signal supplied from the operation unit 40.

In the load determination operation, the control unit 45 drives the inverter circuit 123 with a specific drive signal for use in load determination. The load determining unit 46 detects coil current from a current detection signal supplied from the coil-current detecting unit 25.

Next, the control unit 45 increases the driving frequency of the inverter circuit 123 from a low frequency to a high frequency. The load determining unit 46 successively detects coil current from current detection signals from the coil-current detecting unit 25.

In the case where the load is the power receiving device 200, when the driving frequency is increased, the impedance decreases (current increases) from time at which the frequency reaches a certain frequency. In accordance with the presence or absence of such a resonant characteristic, it can be determined whether the load is the object 5 or the power receiving device 200.

That is, in the case where the current detection signal from the coil-current detecting unit 25 increases (the impedance decreases) as the driving frequency of the inverter circuit 123 is increased, the load determining unit 46 determines that the load placed on the top plate 4 is the power receiving device 200.

By contrast, in the case where the current detection signal from the coil-current detecting unit 25 decreases (the impedance increases) as the driving frequency of the inverter circuit 123 is increased, the load determining unit 46 determines that the load placed on the top plate 4 is the object 5.

It should be noted that the driving frequency to be changed in the load determination operation is set to a frequency higher than the resonant frequency of the first induction heating coil 11 and the power-transmission-side resonant capacitor 24.

For example, in the case where the resonant frequency of the first induction heating coil 11 and the power-transmission-side resonant capacitor 24 is 18 kHz, the driving frequency to be changed in the load determination operation is set to a frequency higher than or equal to 20 kHz.

Thereby, it is possible to prevent a phase-advanced signal from flowing through the inverter circuit 123 and breaking the inverter circuit 123.

As described above, in embodiment 2, in the case where the impedance exhibits a resonant characteristic that the impedance decreases as the driving frequency of the inverter circuit 123 is increased, the load determining unit 46 determines that the load is the power receiving device 200. In other words, the load determination is made in accordance with the presence or absence of a resonant characteristic which the object 5 such as a pot does not have, thereby improving the accuracy of the load determination.

Therefore, appropriate power can be supplied to the power receiving device 200. Furthermore, based on a resonant characteristic of the impedance, it is possible to easily and reliably determine whether the load is the object 5 to be inductively heated or the power receiving device 200 to be powered wirelessly.

(Modification)

In embodiment 1, the load determination is made in accordance with whether or not the impedance increases as the driving frequency is decreased, and in embodiment 2, the load determination is made in accordance with whether or not the impedance decreases as the driving frequency is increased. However, the present invention is not limited to these ways.

For example, the load determining unit 46 may determine that the load is the power receiving device 200 in the case where the impedance exhibits a resonant characteristic that the impedance increases or decreases as the driving frequency of the inverter circuit 123 is changed within a predetermined range.

For example, in the case where changing of the coil current changes from decreasing of the coil current to increasing thereof (changing of the impedance changes from increasing of the impedance to decreasing thereof) as the driving frequency of the inverter circuit 123 is increased and decreased within the predetermined range, the load determining unit 46 determines that the load placed on the top plate 4 is the power receiving device 200.

Also in the case of applying the above way, it is possible to make the load determination in accordance with the presence or absence of a resonant characteristic which the object 5 such as a pot does not have, thus improving the accuracy of load determination.

Embodiment 3

With respect to embodiment 3, the following description is made by referring to a load determination operation in which the load determination is made in accordance with how much the impedance changes as the driving frequency of the inverter circuit 123 is changed within a predetermined range.

Also, the load determination operation according to embodiment 3 will be described mainly referring to on what point it is different from the load determination operation according to embodiment 1.

(Load Determination Operation)

The load determining unit 46 provided in the control unit 45 starts a load determination operation based on an operation start signal supplied from the operation unit 40.

In the load determination operation, the control unit 45 drives the inverter circuit 123 with a specific drive signal for use in load determination. The load determining unit 46 detects coil current from a current detection signal supplied from the coil-current detecting unit 25.

Next, the control unit 45 changes the driving frequency of the inverter circuit 123 within a predetermined range. This range may be set to an arbitrary range of frequencies, which falls within the range of 20 kHz to less than 100 kHz.

The load determining unit 46 successively detects coil current from current detection signals supplied from the coil-current detecting unit 25.

It should be noted that the variation of the impedance varies in accordance with whether the load is the power receiving device 200 or the object 5 such as a pot.

For example, in an example illustrated in FIG. 5, when the driving frequency of the inverter circuit 123 is changed from 50 kHz to 30 kHz, the impedance decreases by approximately 30% if the load is the object 5 such as a pot, whereas the impedance increases by approximately 400% if the load is the power receiving device 200. Therefore, these two cases are clearly different from each other in the variation of the impedance.

The load determining unit 46 according to embodiment 3 makes the load determination based on the above variation of the impedance (the variation of the coil current).

To be more specific, in the case where the current detection signal supplied from the coil-current detecting unit 25 changes by a predetermined amount or more as the driving frequency of the inverter circuit 123 is changed within a predetermined range, the load determining unit 46 determines that the load placed on the top plate 4 is the power receiving device 200.

By contrast, in the case where the current detection signal supplied from the coil-current detecting unit 25 does not change by the predetermined amount or more, the load determining unit 46 determines that the load placed on the top plate 4 is the object 5.

It should be noted that the driving frequency to be changed in the load determination operation is set to a frequency higher than the resonant frequency of the first induction heating coil 11 and the power-transmission-side resonant capacitor 24.

For example, in the case where the resonant frequency of the first induction heating coil 11 and the power-transmission-side resonant capacitor 24 is 18 kHz, the driving frequency to be changed in the load determination operation is set to a frequency higher than or equal to 20 kHz.

Thereby, it is possible to prevent an advanced-phase signal from flowing through the inverter circuit 123 and breaking it.

As described above, in embodiment 3, in the case where the impedance exhibits a resonant characteristic that the impedance changes by the predetermined amount as the driving frequency of the inverter circuit 123 is changed within the predetermined range, the load determining unit 46 determines that the load is the power receiving device 200. In other words, the load determining unit 46 makes the load determination in accordance with the presence or absence of a resonant characteristic which the object 5 such as a pot does not have. Thus, it is possible to improve the accuracy of load determination.

Therefore, appropriate power can be supplied to the power receiving device 200. Furthermore, based on a resonant characteristic of the impedance, it is possible to easily and reliably determine whether the load is the object 5 to be inductively heated or the power receiving device 200 to be powered wirelessly.

Embodiment 4

The configuration and operation of the induction heating cooker 100 according to embodiment 4 will be described mainly by referring to on what point they are different from the configuration and operation according to each of embodiments 1 to 3.

Figure 6:
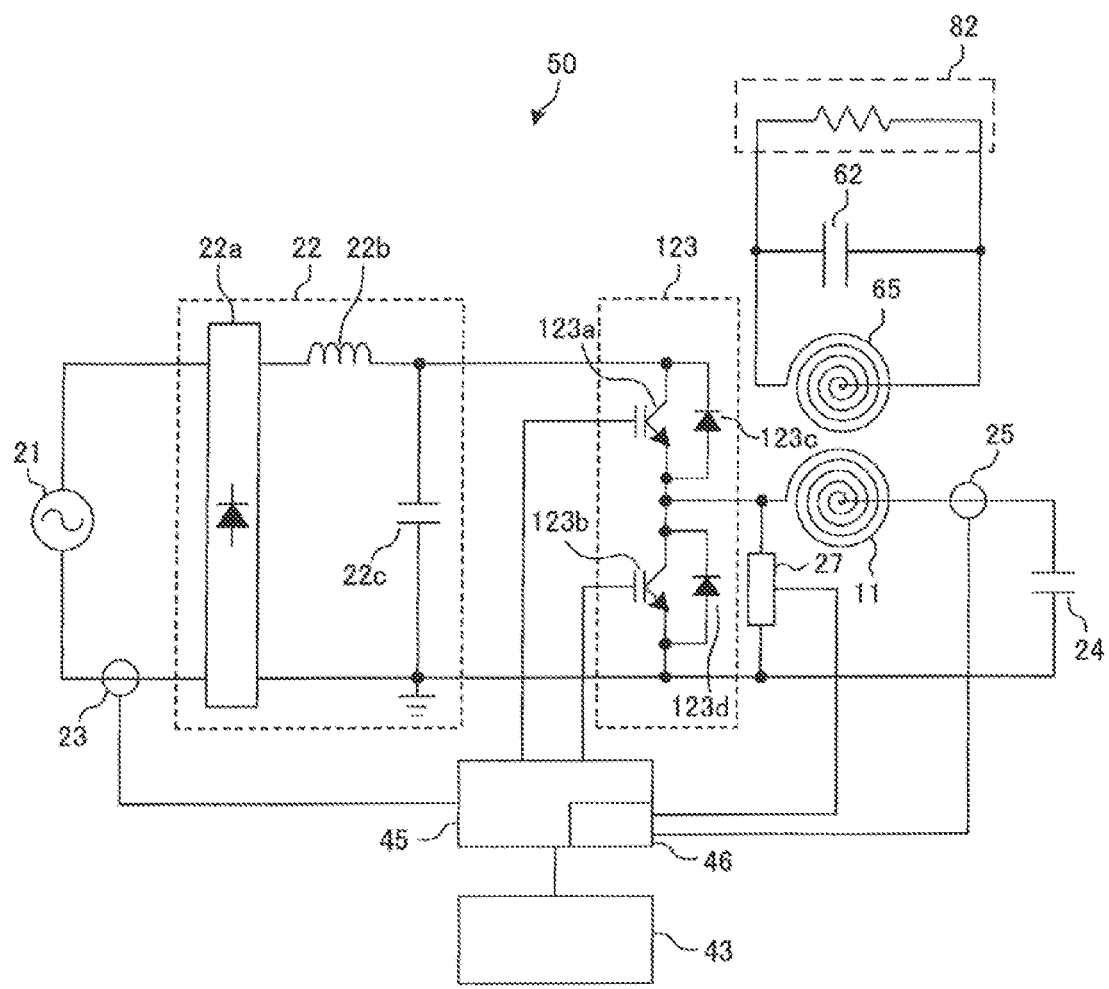
FIG. 6 is a circuit diagram illustrating configurations of a power receiving device and a driving circuit of an induction heating cooker according to embodiment 4 of the present invention.

FIG. 6 is a circuit configuration diagram illustrating a power receiving device and a driving circuit of an induction heating cooker according to embodiment 4 of the present invention.

As illustrated in FIG. 6, the driving circuit 50 according to embodiment 4 includes an output-voltage detecting unit 27 that detects the output voltage of the inverter circuit 123. The output-voltage detecting unit 27 is constituted by, for example, a voltage sensor. The output-voltage detecting unit 27 detects an output voltage of the inverter circuit 123, and outputs a voltage signal corresponding to the value of the output voltage to the control unit 45.

(Load Determination Operation)

In a load determination operation, the load determining unit 46 detects coil current from a current detection signal supplied from the coil-current detecting unit 25, and detects an output voltage from a voltage detection signal from the output-voltage detecting unit 27. The load determining unit 46 calculates the impedance of a load based on the coil current and the output voltage.

Then, the load determining unit 46 makes the load determination based on whether or not the impedance of the load exhibits a resonant characteristic as the driving frequency of the inverter circuit 123 is changed.

With respect to the load determination operation, the following way is the same as or similar to the way applied to any of the load determination operations according to embodiments 1 to 3.

For example, in the case where the calculated impedance increases as the driving frequency of the inverter circuit 123 is decreased, the load determining unit 46 determines that the load placed on the top plate 4 is the power receiving device 200.

Also, for example, in the case where the calculated impedance decreases as the driving frequency of the inverter circuit 123 is increased, the load determining unit 46 determines that the load placed on the top plate 4 is the power receiving device 200.

Furthermore, for example, in the case where the calculated impedance changes by a preset amount or more as the driving frequency of the inverter circuit 123 is changed within a predetermined range, the load determining unit 46 determines that the load placed on the top plate 4 is the power receiving device 200.

As described above, in embodiment 4, the load determining unit 46 calculates the impedance based on the coil current and the output voltage, and in the case where the impedance exhibits a resonant characteristic as the driving frequency of the inverter circuit 123 is changed, the load determining unit 46 determines that the load is the power receiving device 200. In other words, the load determining unit 46 makes the load determination in accordance with the presence or absence of a resonant characteristic which the object 5 such as a pot does not have. Thus, the accuracy of load determination can be improved. Therefore, appropriate power can be supplied to the power receiving device 200. Furthermore, based on the resonant characteristic of the impedance, it is possible to easily and reliably determine whether the load is the object 5 to be inductively heated or the power receiving device 200 to be powered wirelessly.

Furthermore, the impedance can be calculated based on the coil current and the output voltage. Therefore, even in the case where a voltage change occurs in the alternating-current power supply 21, and the output voltage of the inverter circuit 123 changes, changing of the impedance of the load can be detected with a high accuracy. Therefore, the determination can be more accurately made.

Embodiment 5

The configuration and operation of the induction heating cooker 100 according to embodiment 5 will be described mainly by referring to on what point they are different from the configuration and operation of each of embodiments 1 to 3.

Figure 7:
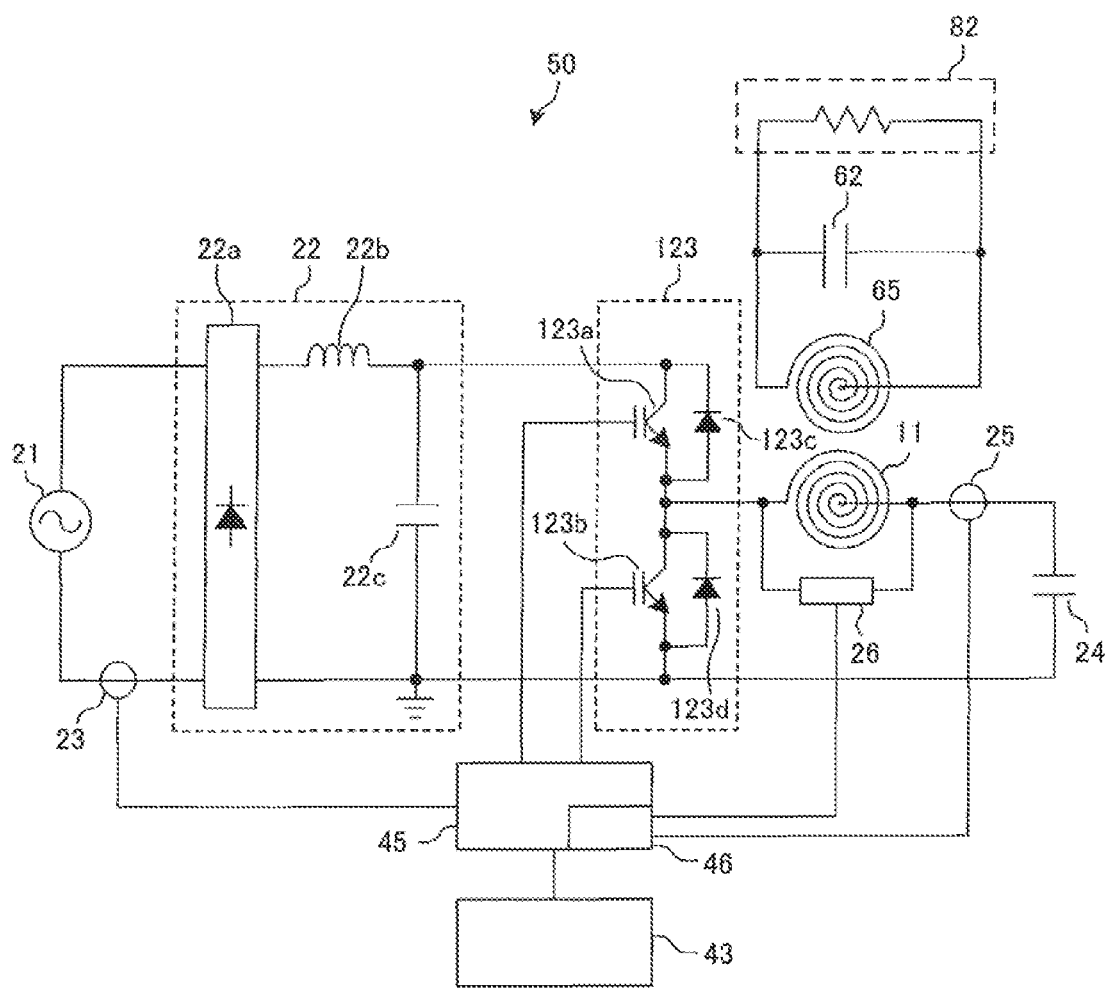
FIG. 7 is a circuit diagram illustrating configurations of a power receiving device and a driving circuit of an induction heating cooker according to embodiment 5 of the present invention.

FIG. 7 is a circuit configuration diagram illustrating a power receiving device and a driving circuit of an induction heating cooker according to embodiment 5 of the present invention.

As illustrated in FIG. 7, the driving circuit 50 according to embodiment 5 includes a coil-voltage detecting unit 26 which detects a coil voltage applied to the first induction heating coil 11. The coil-voltage detecting unit 26 is constituted by, for example, a voltage sensor. The coil-voltage detecting unit 26 detects a coil voltage applied to the first induction heating coil 11, and outputs a voltage signal corresponding to the value of the coil voltage to the control unit 45.

(Load Determination Operation)

In a load determination operation, the load determining unit 46 detects coil current from a current detection signal supplied from the coil-current detecting unit 25, and detects a coil voltage from a voltage detection signal from the coil-voltage detecting unit 26. The load determining unit 46 calculates the impedance of a load based on the coil current and the coil voltage.

Then, the load determining unit 46 makes the load determination based on whether or not the impedance of the load exhibits a resonant characteristic as the driving frequency of the inverter circuit 123 is changed.

With respect to the load determination operation, the following way is the same or similar to the way applied to any of the above load determination operations according to embodiments 1 to 4.

For example, in the case where the calculated impedance increases as the driving frequency of the inverter circuit 123 is decreased, the load determining unit 46 determines that the load placed on the top plate 4 is the power receiving device 200.

Also, for example, in the case where the calculated impedance decreases as the driving frequency of the inverter circuit 123 is increased, the load determining unit 46 determines that the load placed on the top plate 4 is the power receiving device 200.

Furthermore, for example, in the case where the calculated impedance changes by a predetermined amount or more as the driving frequency of the inverter circuit 123 is changed within a predetermined range, the load determining unit 46 determines that the load placed on the top plate 4 is the power receiving device 200.

As described above, in embodiment 5, the load determining unit 46 calculates the impedance based on the coil current and the coil voltage, and in the case where the impedance exhibits a resonant characteristic as the driving frequency of the inverter circuit 123 is changed, the load determining unit 46 determines that the load is the power receiving device 200. In other words, the load determining unit 46 make the load determination in accordance with the presence or absence of a resonant characteristic which the object 5 such as a pot does not have. Thus, the accuracy of load determination can be improved. Therefore, appropriate power can be supplied to the power receiving device 200. Also, based on the resonant characteristic of the impedance, it is possible to easily and reliably determine whether the load is the object 5 to be inductively heated or the power receiving device 200 to be powered wirelessly.

Furthermore, the impedance is calculated based on the coil current and the coil voltage. Thus, for example, even in the case where a voltage change occurs in the alternating-current power supply 21, and the output voltage of the inverter circuit 123 changes, changing of the impedance of the load can be detected with a high accuracy. Thus, the determination can be more accurately made.

Moreover, the resonant characteristics of the power receiving coil 65 and the power-reception-side resonant capacitor 62 of the power receiving device 200 can be detected directly without being affected by the resonant characteristics of the first induction heating coil 11 and the power-transmission-side resonant capacitor 24. Thus, the determination can be further accurately made.

Embodiment 6

The configuration and operation of the induction heating cooker 100 according to embodiment 6 will be described mainly by referring to on what point they are different from the configuration and operation of each of embodiments 1 to 5.

Figure 8:
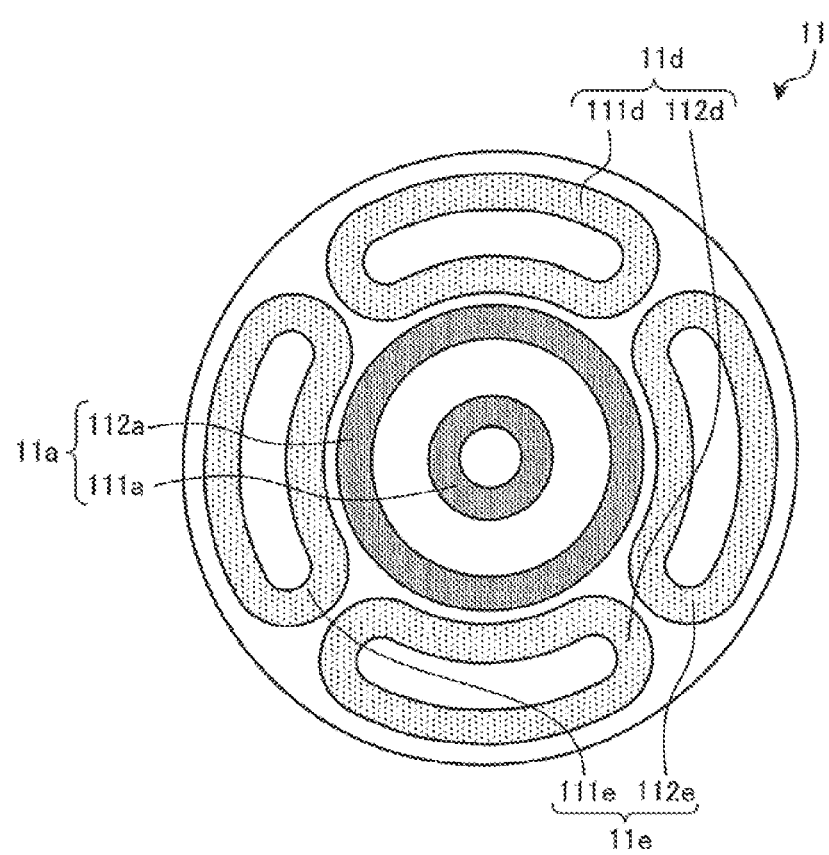
FIG. 8 illustrates an induction heating coil of an induction heating cooker according to embodiment 6 of the present invention.

FIG. 8 illustrates an induction heating coil of an induction heating cooker according to embodiment 6 of the present invention.

Referring to FIG. 8, the first induction heating coil 11 includes an inner-periphery coil 11a provided at the center of the first induction heating coil 11, and outer-periphery coils 11e and 11d provided around the inner-periphery coil 11a. The outer periphery of the first induction heating coil 11 has a substantially circular shape which conforms to the first induction heating zone 1.

The inner-periphery coil 11a includes an inner-periphery inner coil 111a and an inner-periphery outer coil 112a that are substantially concentrically arranged. The inner-periphery inner coil 111a and the inner-periphery outer coil 112a are circular as seen in plan view, and are each formed by circumferentially winding a conductive wire made of an arbitrary insulated metal (for example, copper or aluminum). The inner-periphery inner coil 111a and the inner-periphery outer coil 112a are connected in series to each other, and controlled to be driven by a single driving circuit 50a. The inner-periphery inner coil 111a and the inner-periphery outer coil 112a may be connected parallel to each other, or may be driven by respective independent driving circuits (inverter circuits).

The outer-periphery coil 11d includes an outer-periphery upper coil 111d and an outer-periphery lower coil 112d. The outer-periphery coil 11e includes an outer-periphery left coil 111e and an outer-periphery right coil 112e. The outer-periphery upper coil 111d and the outer-periphery lower coil 112d are connected in series to each other, and controlled to be driven by a single driving circuit 50d. The outer-periphery left coil 111e and the outer-periphery right coil 112e are connected in series to each other, and controlled to be driven by a single driving circuit 50e.

The outer-periphery upper coil 111d, the outer-periphery lower coil 112d, the outer-periphery left coil 111e and the outer-periphery right coil 112e (which will be hereinafter also referred to as "outer-periphery coils" or "each outer-periphery coil") are disposed around the inner-periphery coil 11a and substantially along an outer periphery of the inner-periphery coil 11a.

Each of the four outer-periphery coils is formed in the shape of a substantially quarter circle (the shape of a banana or a cucumber) as seen in plan view, and is formed by winding a conductive wire made of an arbitrary insulated metal (for example, copper or aluminum) along an outer periphery of the outer-periphery coil formed in the shape of the substantially quarter circle. To be more specific, each outer-periphery coil is configured such that in a quarter-circle shaped region adjacent to the inner-periphery coil 11a, the outer-periphery coil extends substantially along an outer periphery of the inner-periphery coil 11a which is circular as seen in plan view. It should be noted that the number of outer-periphery coils is not limited to four. The shape of each outer-periphery coil is not limited to the above shape. For example, a plurality of circular outer-periphery coils may be used. The outer-periphery coils may be connected parallel to each other. The outer-periphery upper coil 111d and the outer-periphery lower coil 112d may be driven by a single driving circuit (inverter circuit).

The driving circuits 50a, 50d and 50e have the same configuration as the driving circuit 50 according to embodiment 1.

In embodiment 6, with respect to each of the driving circuits 50a, 50d and 50e, the control unit 45 makes the load determination with respect to a load placed above each driving circuit. The load determination operation is the same as any of the load determination operations according to embodiments 1 to 5.

(Operation)

The following description is made regarding an operation to be performed in the case where the object 5 and the power receiving device 200 are placed on the first induction heating zone 1.

With respect to each of the driving circuits 50a, 50d and 50e, the load determining unit 46 of the control unit 45 varies the driving frequency of the inverter circuit 123 of each driving circuit, and make the load determination regarding a load placed above each driving circuit based on the impedance characteristics of the output side of the inverter circuit 123.

The control unit 45 controls any of the driving circuits 50a, 50d and 50e which is determined by the load determining unit 46 as a driving circuit or circuits above which the object 5 is placed, in accordance with heating power to be applied to induction heating, to thereby perform a heating operation to inductively heat the object 5. As a result, the object 5 placed on the top plate 4 is inductively heated.

By contrast, the control unit 45 controls one of the driving circuits 50a, 50d and 50e which is determined by the load determining unit 46 as a driving circuit or circuits above which the power receiving device 200 is placed, in accordance with power to be supplied to the power receiving coil 65, to thereby perform a power transmission operation to supply power to the power receiving coil 65.

It should be noted that the load determining unit 46 may determine whether a load is present or absent. In this case, the control unit 45 stops the operation of a driving circuit which is determined as a driving circuit above which a load is absent.

The control unit 45 controls each driving circuit such that the sum of power for inductively heating the object 5 and power to be transmitted to the power receiving coil 65 is less than or equal to a preset power (rated power). For example, the sum is controlled to be less than or equal to 3 kW.

For example, in the case where the object 5, which is a magnetic body such as a hot plate, is placed above the inner-periphery coil 11a and the outer-periphery coil 11e, and the power receiving device 200 is placed above the outer-periphery coil 11d, power can be given to the outer-periphery coil 11d up to 1.5 kW, and power can be also given to the object 5 such as the hot plate up to the value of the remaining power.

As described above, in embodiment 6, of a plurality of inverter circuits 123, an inverter circuit 123 having a resonant characteristic is controlled to perform a power transmission operation, and an inverter circuit 123 not having a resonant characteristic is controlled to perform a heating operation.

Therefore, at a single heating zone, heating by induction heating and heating by wireless power transmission can be performed at the same time, thus improving convenience. Furthermore, the heating by induction heating and the heating by wireless power transmission can be controlled individually.

Embodiment 7

The configuration and operation of the induction heating cooker 100 according to embodiment 7 will be described mainly by referring to how they are different from the configuration and operation of each of embodiments 1 to 6.

(Load Determination Operation)

The load determining unit 46 performs the load determination operation in the same manner as in any of embodiments 1 to 5.

The control unit 45 causes the display unit 41 to display the result of the load determination made by the load determining unit 46.

It is therefore possible for a user to check the result of the load determination by the load determining unit 46.

It may be set that the result of the determination by the load determining unit 46 can be corrected by an operation from the operation unit 40. For example, after the control unit 45 causes the display unit 41 to display the result of the determination, when an operation to correct the result of the determination is input by operating the operation unit 40, the control unit 45 causes an induction heating operation or power transmission operation to be performed in accordance with the corrected result of the determination.

Thereby, the result of the determination can be corrected by the operation from the user. Thus, even if a load indicated by the result of the load determination by the load determining unit 46 does not conform with a load actually placed on the top plate 4, it is possible to prevent the heating operation from being mistakenly performed on the power receiving device 200 or the power transmission operation from being mistakenly performed on the object 5.

Embodiment 8

The configuration and operation of the induction heating cooker 100 according to embodiment 8 will be described mainly by referring to how they are different from the configuration and operation of each of embodiments 1 to 7.

In embodiment 8, when the load determination is made by the load determining unit 46, the control unit 45 stores information (learning data) regarding the impedance on the output side of the inverter circuit 123 in the memory 48. Then, in a subsequent load determination operation, the load determining unit 46 sets the amount by which the driving frequency of the inverter circuit 123 is to be changed, based on the information stored in the memory 48.

For example, in a load determination operation, the resonant characteristics of the power receiving device 200 (a relationship between the frequency and the impedance) are stored as data into the memory 48. From a subsequent load determination operation onward, the driving frequency is changed based on information (learning data) stored in the memory 48. For example, in the case where the driving frequency is changed from a high frequency to a low frequency with respect to the resonant characteristics as illustrated in FIG. 5, the impedance (coil current) is detected only at two frequency points of 50 kHz and 30 kHz to determine whether the load is the power receiving device 200 or not. Thereby, the load determination operation can be performed at a higher speed.

For example, in a load determination operation, an impedance value or coil current value is stored as data in the memory 48 at preset frequency intervals (for example, at intervals of 5 kHz). Then, from a subsequent load determination operation onward, in the case of changing the driving frequency of the inverter circuit 123, a frequency range in which the variation of the impedance or coil current value in the last load determination operation is small is skipped.

Also, for example, a frequency at which the variation of the impedance (coil current) reaches a peak in a load determination operation is stored as data in the memory 48. Then, from a subsequent load determination operation onward, in the case of changing the driving frequency of the inverter circuit 123, the driving frequency of the inverter circuit 123 is changed only within a predetermined range of frequencies including a frequency at which the variation reaches a peak in the last load determination operation.

In such a manner, the amount by which the driving frequency of the inverter circuit 123 is to be changed is determined based on the information stored in the memory 48. Thus, the load determination can be made at a higher speed. Also, by learning the resonant characteristics of the power receiving device 200 for use by the user, the load determination can be more accurately made.

If the resonant characteristics (learning data) of the power receiving device 200 that are stored in the last load determination operation are greatly different from those of the power receiving device 200 that are to be determined from the subsequent load determination operation onward, a normal load determination operation in which the driving frequency of the inverter circuit 123 is generalized within a predetermined range may be performed.

Embodiment 9

The above descriptions concerning embodiments 1 to 8 are made by referring to the induction heating cooker 100 which performs transmission of power to the power receiving device 200 and heating of the object 5. The following description concerning embodiment 9 is made by referring to a wireless power transmission apparatus 300 in which the function of heating the object 5 is omitted, and which performs only transmission of power to the power receiving device 200.

Figure 9:
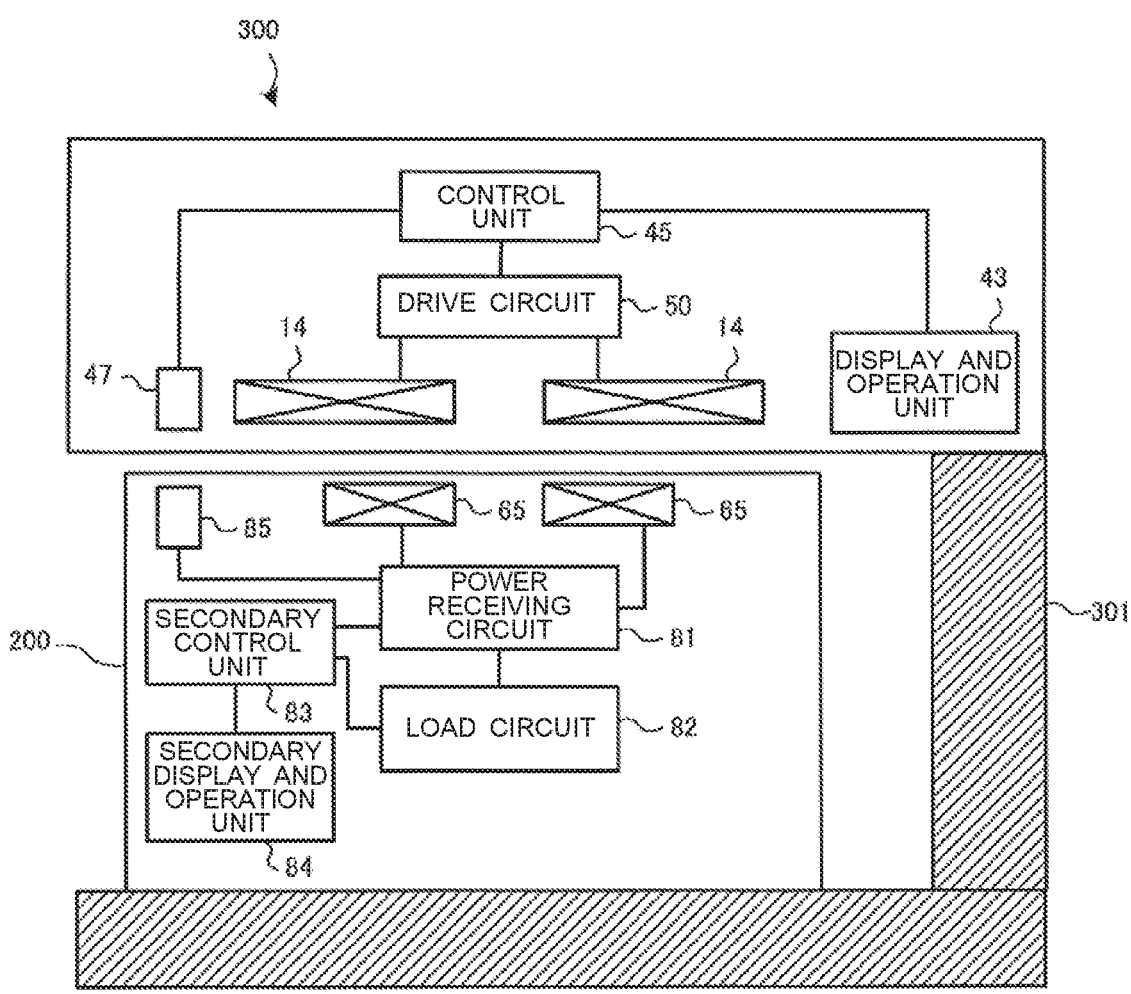
FIG. 9 is a block diagram illustrating configurations of a power receiving device and a wireless power transmission apparatus according to embodiment 9 of the present invention.

FIG. 9 is a block diagram illustrating the configuration of a power receiving device and a wireless power transmission apparatus according to embodiment 9 of the present invention.

Referring to FIG. 9, the wireless power transmission apparatus 300 and the power receiving device 200 form a wireless power transmission system.

As illustrated in FIG. 9, the wireless power transmission apparatus 300 includes a support 301 configured to support the power receiving device 200 within a high-frequency magnetic field (electromagnetic field) generated from a power feeding coil 14.

The power receiving device 200 has the same configuration as in embodiments 1 to 8.

The power feeding coil 14 of the wireless power transmission apparatus 300 has, for example, a circular shape as seen in plan view, that conforms to the shape of the power receiving coil 65 of the power receiving device 200. The power feeding coil 14 is formed by circumferentially winding a conductive wire made of arbitrary insulated metal (for example, copper or aluminum). The configuration of the other portion of the wireless power transmission apparatus 300 is the same as or similar to that of each of embodiments 1 to 8.

The load determining unit 46 of the control unit 45 according to embodiment 9 performs the above load determination operation. The control unit 45 according to embodiment 9 performs the above power transmission operation.

In such a manner, the support 301 of the wireless power transmission apparatus 300 may be configured to support the power receiving device 200 at a position below the wireless power transmission apparatus 300. The present invention is not limited to such a positional relationship. The power receiving device 200 may be supported at an arbitrary position with respect to the wireless power transmission apparatus 300.

The wireless power transmission apparatus 300 may be configured not to perform the heating operation. In such a configuration also, appropriate power can be supplied to the power receiving device 200.

Furthermore, since the load determination is performed based on the resonant characteristic of the impedance of the power receiving device 200, it is possible to easily and reliably determine whether or not the load is the power receiving device 200. Thus, appropriate power can be supplied to the power receiving device 200. It is therefore possible to provide a wireless power transmission system having a high reliability.

The invention claimed is:

1. An induction heating cooker configured to perform transmission of power to a power receiving device which includes a resonant circuit and heating of an object to be heated, the induction heating cooker comprising:
a top plate on which the power receiving device or the object is to be placed;
a coil provided under the top plate;
an inverter circuit configured to supply a high-frequency current to the coil; and
a controller configured to control driving of the inverter circuit to switch an operation to be performed, between a power transmission operation and a heating operation, the power transmission operation being an operation to transmit power to the power receiving device, the heating operation being an operation to inductively heat the object,
wherein the controller is configured to:
perform the power transmission operation if an impedance on an output side of the inverter circuit exhibits a resonant characteristic as a driving frequency of the inverter circuit is changed; and
perform the heating operation if the impedance on the output side of the inverter circuit does not exhibit a resonant characteristic as the driving frequency of the inverter circuit is changed.

2. The induction heating cooker of claim 1,
wherein the resonant characteristic is a characteristic in which the impedance increases as the driving frequency of the inverter circuit is decreased.

3. The induction heating cooker of claim 1,
wherein the resonant characteristic is a characteristic in which the impedance decreases as the driving frequency of the inverter circuit is increased.

4. The induction heating cooker of claim 1,
wherein the resonant characteristic is a characteristic in which the impedance increases and decreases as the driving frequency of the inverter circuit is changed within a predetermined range.

5. The induction heating cooker of claim 1,
wherein the resonant characteristic is a characteristic in which the impedance changes by a preset amount or more as the driving frequency of the inverter circuit is changed within a predetermined range.

6. The induction heating cooker of claim 1, further comprising
a power-transmission-side resonant capacitor configured to form together with the coil, a resonant circuit,
wherein the controller is configured to cause, when changing the driving frequency of the inverter circuit, the driving frequency to be higher than a resonant frequency of the coil and the power-transmission-side resonant capacitor.

7. The induction heating cooker of claim 1,
wherein the driving frequency of the inverter circuit is changed within a range which falls within a range of 20 kHz to less than 100 kHz.

8. The induction heating cooker of claim 1, further comprising
a coil-current detector configured to detect a coil current flowing through the coil,
wherein the controller is configured to perform the power transmission operation to transmit power to the power receiving device, if the coil current exhibits a resonant characteristic as the driving frequency of the inverter circuit is changed.

9. The induction heating cooker of claim 1, further comprising:
a coil-current detector configured to detect a coil current flowing through the coil; and
an output-voltage detector configured to detect an output voltage of the inverter circuit,
wherein the controller is configured to:
determine the impedance based on the coil current and the output voltage; and
perform the power transmission operation to transmit power to the power receiving device, if the impedance exhibits a resonant characteristic as the driving frequency of the inverter circuit is changed.

10. The induction heating cooker of claim 1, further comprising:

a coil-current detector configured to detect a coil current flowing through the coil; and a coil-voltage detector configured to detect a coil voltage applied to the coil, wherein the controller is configured to:
  determine the impedance based on the coil current and the coil voltage; and
  perform the power transmission operation to transmit power to the power receiving device, if the impedance exhibits a resonant characteristic as the driving frequency of the inverter circuit is changed.

11. The induction heating cooker of claim 1, further comprising a notification unit,
  wherein the controller is configured to control the notification unit to indicate that a load is the power receiving device, if the impedance on the output side of the inverter circuit has a resonant characteristic.

12. The induction heating cooker of claim 1, further comprising:
  a storage unit configured to store information regarding the impedance on the output side of the inverter circuit at time of changing the driving frequency of the inverter circuit,
  wherein the controller is configured to set a value by which the driving frequency of the inverter circuit is to be changed, based on the information stored in the storage unit.

13. A wireless power transmission system comprising:
  the induction heating cooker of claim 1; and
  the power receiving device to be placed on the top plate of the induction heating cooker,
  wherein the power receiving device includes
    a power receiving coil configured to receive power from the coil when the power receiving coil is located within a high-frequency magnetic field generated by the coil, and
    a reception-side resonant capacitor configured to form together with the power receiving coil, a resonant circuit.

14. The induction heating cooker of claim 1,
  wherein the top plate has a heating zone indicating a position at which the object is to be placed,
  wherein the coil comprises a plurality of coils provided for the heating zone,
  wherein the inverter circuit comprises a plurality of inverter circuits which are each provided for an associated one of the plurality of coils, and
  wherein the controller is configured to:
    determine whether an impedance on an output side of each of the plurality of inverter circuits exhibits a resonant characteristic as a driving frequency of the each of the plurality of inverter circuits is changed,
    control any of the plurality of inverter circuits which is determined as an inverter circuit having an output side whose impedance exhibits the resonance characteristic, to perform the power transmission operation, and
    control any of the plurality of inverter circuits which is determined as an inverter circuit having an output side whose impedance does not exhibit the resonant characteristic, to perform the heating operation.

* * * * *